(12) United States Patent
Hsu

(10) Patent No.: US 10,050,455 B2
(45) Date of Patent: Aug. 14, 2018

(54) STRUCTURE WITH DETACHABLE BATTERY FOR ELECTRONIC DEVICE

(71) Applicant: GETAC TECHNOLOGY CORPORATION, Hsinchu County (TW)

(72) Inventor: Wan-Lin Hsu, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 268 days.

(21) Appl. No.: 15/166,023

(22) Filed: May 26, 2016

(65) Prior Publication Data

US 2017/0179448 A1    Jun. 22, 2017

Related U.S. Application Data

(60) Provisional application No. 62/270,978, filed on Dec. 22, 2015.

(51) Int. Cl.
*H01M 2/10*     (2006.01)
*H02J 7/00*     (2006.01)

(52) U.S. Cl.
CPC ......... *H02J 7/0044* (2013.01); *H01M 2/1066* (2013.01); *H01M 2220/30* (2013.01)

(58) Field of Classification Search
CPC ............................ H01M 2/1022; H02J 7/0044
See application file for complete search history.

(56) References Cited

U.S. PATENT DOCUMENTS

| | | | | |
|---|---|---|---|---|
| 2004/0214077 | A1* | 10/2004 | Huang | H01M 2/1066 429/97 |
| 2006/0019530 | A1* | 1/2006 | Chun | H01M 2/1066 439/500 |
| 2016/0306389 | A1* | 10/2016 | Urimoto | G06F 1/1656 |

* cited by examiner

*Primary Examiner* — Carlos Barcena

(57) ABSTRACT

A structure with detachable battery for an electronic device includes an electronic device casing, a guiding structure, and a sliding tongue. The electronic device casing has a chamber for receiving a battery. The guiding structure is disposed on an outer sidewall of a battery. The guiding structure includes a guiding groove. The guiding groove and the chamber are open toward each other. An engaging groove is laterally disposed in the guiding groove. The engaging groove is open in a transverse direction of the chamber. A releasing-guiding slope opposite the engaging groove is disposed in the guiding groove to extend from the opening of the guiding groove and tilt toward the engaging groove. The sliding tongue is disposed slidably on an inner sidewall of the chamber such that battery becomes fixed inside the chamber or slidably abuts against the releasing-guiding slope, thereby ejecting the battery out of the chamber.

13 Claims, 16 Drawing Sheets

STRUCTURE WITH DETACHABLE BATTERY FOR ELECTRONIC DEVICE

BACKGROUND OF THE INVENTION

Field of the Invention

The present invention relates to a structure with detachable battery for electronic devices and, more particularly, to a battery to be easily detached from the electronic device.

Description of the Prior Art

Batteries are components indispensable to mobile electronic devices in supplying power to the mobile electronic devices. In general, a battery is fixed to a mobile electronic device by a locking structure, such as a hook, a plug or a watertight door. To meet waterproof, dustproof and fallproof requirements, conventional locking structures are so intricate that battery replacement entails a complicated procedure, thereby precluding quick battery replacement.

In view of the aforesaid drawback of the prior art, the inventor of the present invention conducted research and applied related theories, so as to improve the prior art.

SUMMARY OF THE INVENTION

The present invention provides a battery to be easily detached from the electronic device.

The present invention provides a structure with detachable battery for an electronic device, comprising an electronic device casing, a guiding structure, and a sliding tongue. The electronic device casing has a chamber for receiving a battery. The guiding structure is disposed on an outer sidewall of the battery. The guiding structure comprises a guiding groove. The guiding groove and the chamber are open toward each other. An engaging groove is laterally disposed in the guiding groove. The engaging groove is open in a transverse direction of the chamber. A releasing-guiding slope opposite the engaging groove is disposed in the guiding groove. The releasing-guiding slope extends from the opening of the guiding groove and tilts toward the engaging groove. The sliding tongue is disposed slidably on an inner sidewall of the chamber to not only slide within the guiding groove but also selectively slide and become fitted into the engaging groove such that battery is fixed inside the chamber or slidably abuts against the releasing-guiding slope, thereby ejecting the battery out of the chamber.

A restoring member is connected between the sliding tongue and the electronic device casing. The restoring member is adapted to move the sliding tongue toward the engaging groove. The sliding tongue has a first positioning structure. The electronic device has a second positioning structure corresponding in position to the first positioning structure. When the restoring member removes the sliding tongue from the engaging groove, the first positioning structure becomes engaged with the second positioning structure such that the sliding tongue is fixed in place. The restoring member is a spring. Alternatively, the restoring member is a resilient arm that connects with the electronic device casing and abuts against the sliding tongue. The resilient arm has a diversion slope that abuts against the sliding tongue. The sliding tongue slides between a first position and a second position, and the rim of the engaging groove is defined with a locking-guiding slope, with the sliding tongue being located at the first position and the battery being pushed into the chamber, the locking-guiding slope abuts against the sliding tongue and guides the sliding tongue toward the second position, and in consequence the sliding tongue is moved into the engaging groove by the restoring member. The sliding tongue slides between a first position and a second position, and the rim of the engaging groove is defined with a locking-guiding slope, with the sliding tongue being located at the first position and the battery being pushed into the chamber, the locking-guiding slope abuts against the sliding tongue and guides the sliding tongue toward the second position, and in consequence the releasing-guiding slope abuts against the sliding tongue and guides the sliding tongue into the engaging groove. The rim of the engaging groove is defined with a guiding angle. The guiding angle guides the sliding tongue into the engaging groove. The sliding tongue slides between a first position and a second position so that, with the sliding tongue being located at the first position and the battery being positioned in the chamber, the sliding tongue is fitted into the engaging groove. The sliding tongue slides between a first position and a second position so that, with the sliding tongue being located at the second position, the sliding tongue abuts against the releasing-guiding slope, thereby ejecting the battery out of the chamber. The sliding tongue slides between a first position and a second position so that, with the sliding tongue being located at the second position and the battery being pushed into the chamber, the releasing-guiding slope abuts against the sliding tongue and guides the sliding tongue into the engaging groove. The rim of the engaging groove is defined with a guiding angle. The guiding angle guides the sliding tongue into the engaging groove. The sliding tongue has a magnetic component. The electronic device has a reed switch corresponding in position to the magnetic component. The electronic device starts a backup power as soon as the reed switch senses the magnetic component and thereby determines that the sliding tongue has exited the engaging groove.

DETAILED DESCRIPTION OF THE EMBODIMENTS

Figure 1:
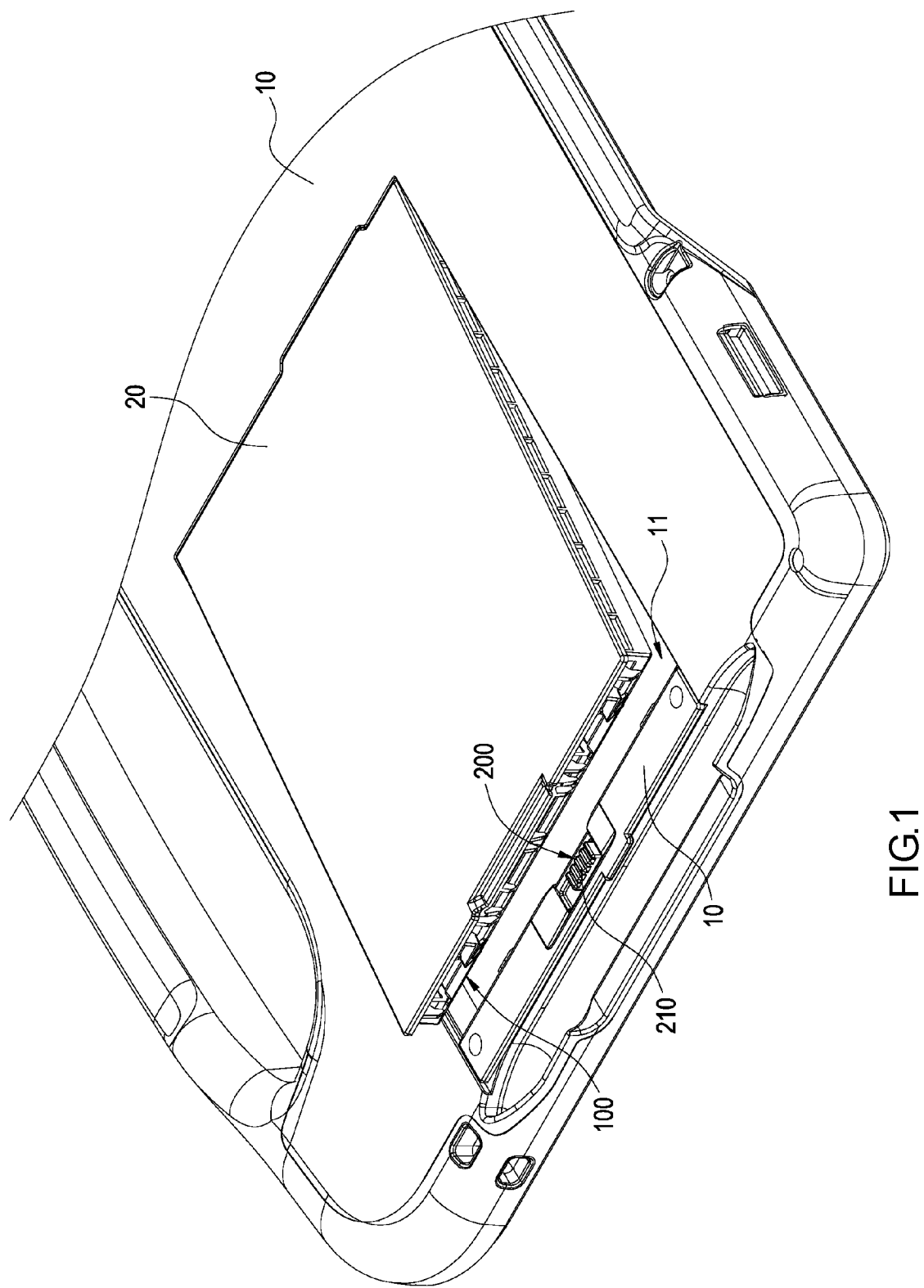
FIG. 1 is a perspective schematic view of a structure with detachable battery for an electronic device according to the first embodiment of the present invention.
Figure 2:
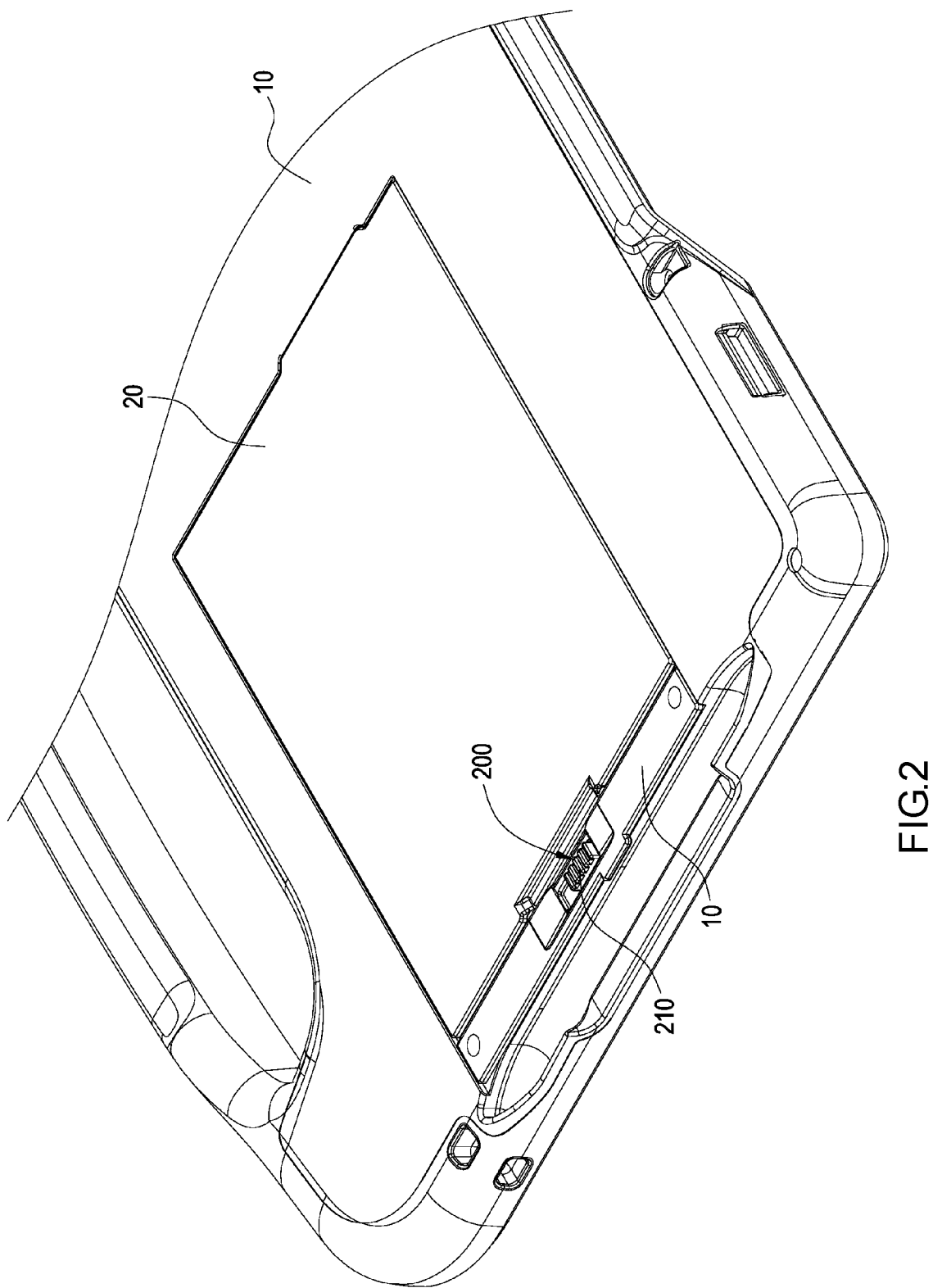
FIG. 2 is another perspective schematic view of the structure with detachable battery for an electronic device according to the first embodiment of the present invention.

Referring to FIG. 1 and FIG. 2, the first embodiment of the present invention provides a battery mounting and dismounting structure for an electronic device. The battery mounting and dismounting structure comprises an electronic device casing 10, a guiding structure 100, and a sliding tongue 200.

The electronic device casing 10 receives components of the electronic device. The electronic device casing 10 contracts centrally to form a chamber 11. The chamber 11 receives a battery 20 that supplies power to the electronic device in operation.

Figure 3:
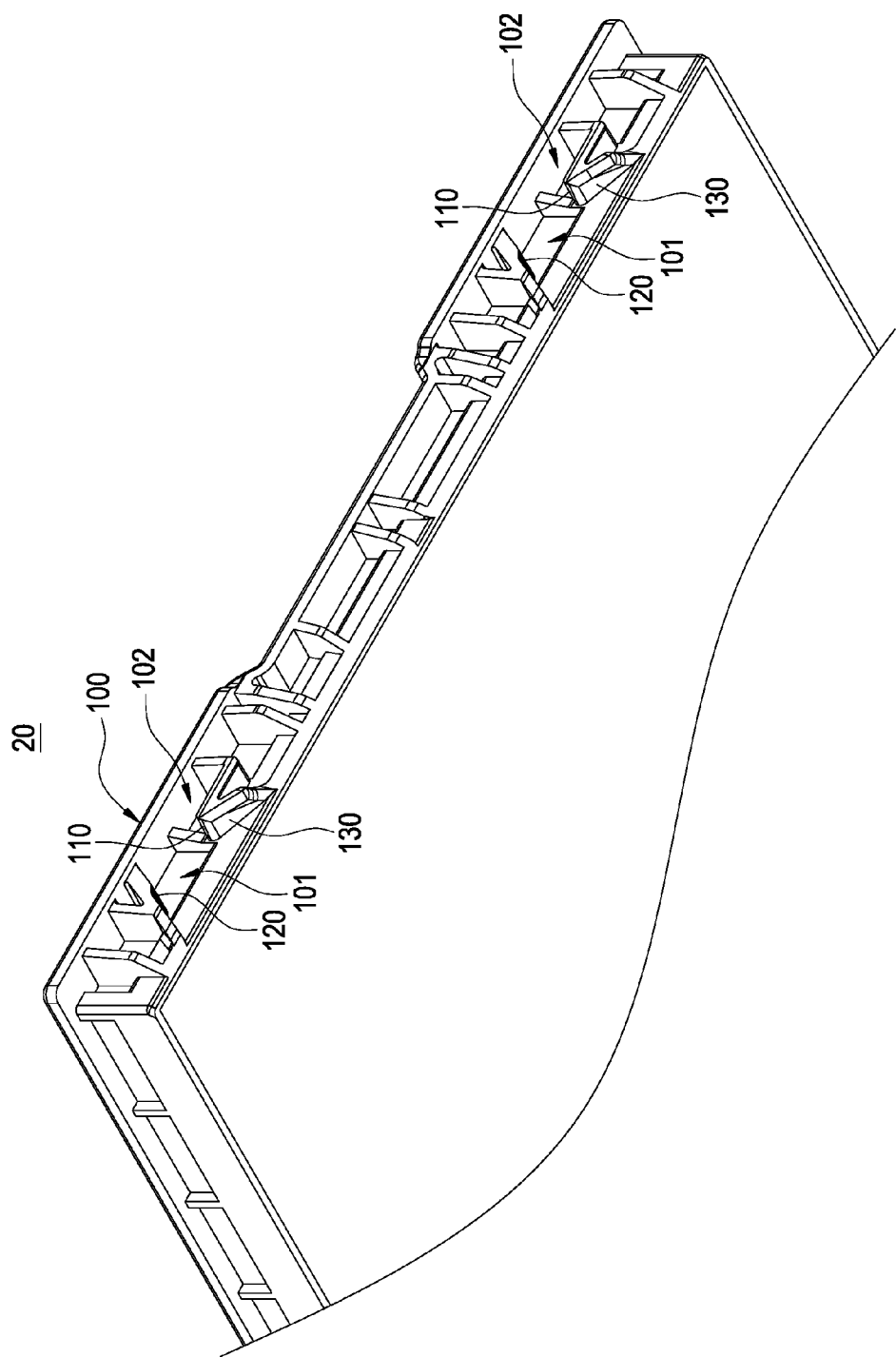
FIG. 3 is a schematic view of a guiding structure of the structure with detachable battery for an electronic device according to the first embodiment of the present invention.

Referring to FIG. 3, the guiding structure 100 is disposed on an outer sidewall of the battery 20. In this embodiment, the battery 20 is preferably flat. The guiding structure 100 is disposed on a lateral side of the battery 20, and the lateral side of the battery 20 defines the thickness of the battery 20. The guiding structure 100 comprises at least one guiding groove 101. In this embodiment, the guiding structure 100 comprises two guiding grooves 101 which are equal in structure and function; hence, for illustrative sake, only one of the guiding grooves 101 is described below. The guiding groove 101 and the chamber 11 are open toward each other. An engaging groove 102 is laterally disposed in the guiding groove 101. The engaging groove 102 is open in a transverse direction of the chamber 11. The rim of the engaging groove 102 is defined with a guiding angle 110. A releasing-guiding slope 120 opposite the engaging groove 102 is disposed in the guiding groove 101. The releasing-guiding slope 120 extends from the opening of the guiding groove 101 and tilts toward the engaging groove 102.

Referring to FIG. 4 through FIG. 10, the sliding tongue 200 is disposed slidably on an inner sidewall of the chamber 11 and has at least one tongue portion 201. The at least one tongue portion 201 slides within the guiding grooves 101, respectively. In this embodiment, the sliding tongue 200 corresponds in position to the guiding structure 100 and therefore has two tongue portions 201 which are equal in structure and function. The sliding tongue 200 slides within the electronic device casing 10 to allow the tongue portions 201 to slide within the guiding groove 101. Preferably, the sliding tongue 200 slides linearly between a first position and a second position. The sliding tongue 200 has a stud 210. The stud 210 protrudes from the electronic device casing 10 so that a user can push the stud 210 in a manner to allow the sliding tongue 200 to slide between a first position (shown in FIG. 9) and a second position (shown in FIG. 10). The first position and the second position are any two different position points in the electronic device casing 10. The present invention is not restrictive of how the first position and the second position relate to the electronic device casing 10. The relation between the sliding tongue 200 located at the first position or the second position and the guiding structure 100 is defined later. When the sliding tongue 200 is located at the first position, the sliding tongue 200 becomes engaged with the guiding structure 100 such that the battery 20 is fixed inside the chamber 11. The tongue portions 201 exit the engaging grooves 102, respectively, as soon as the sliding tongue 200 reaches the second position.

Figure 4:
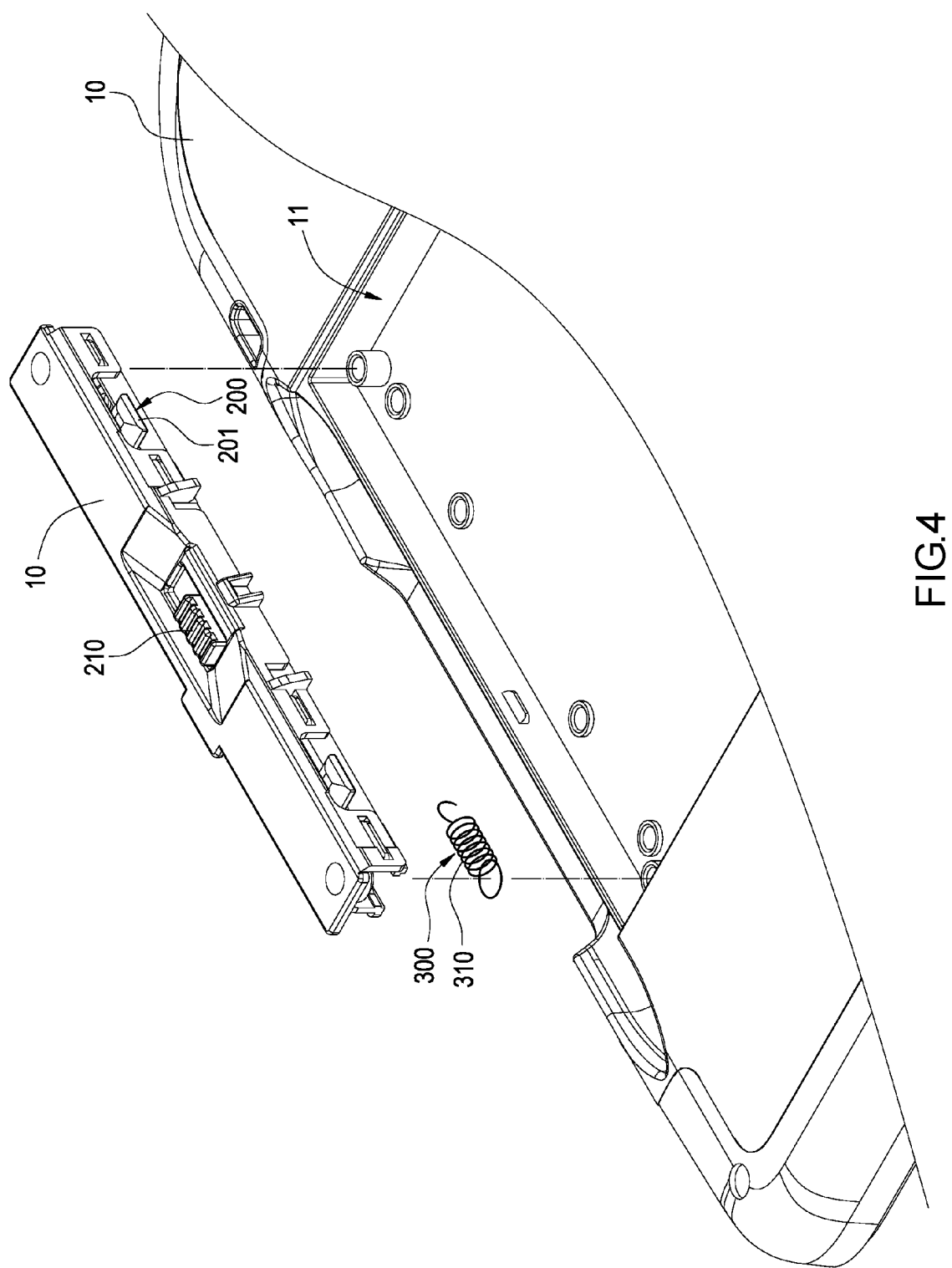
FIG. 4 is an exploded schematic view of a sliding tongue of the structure with detachable battery for an electronic device according to the first embodiment of the present invention.
Figure 5:
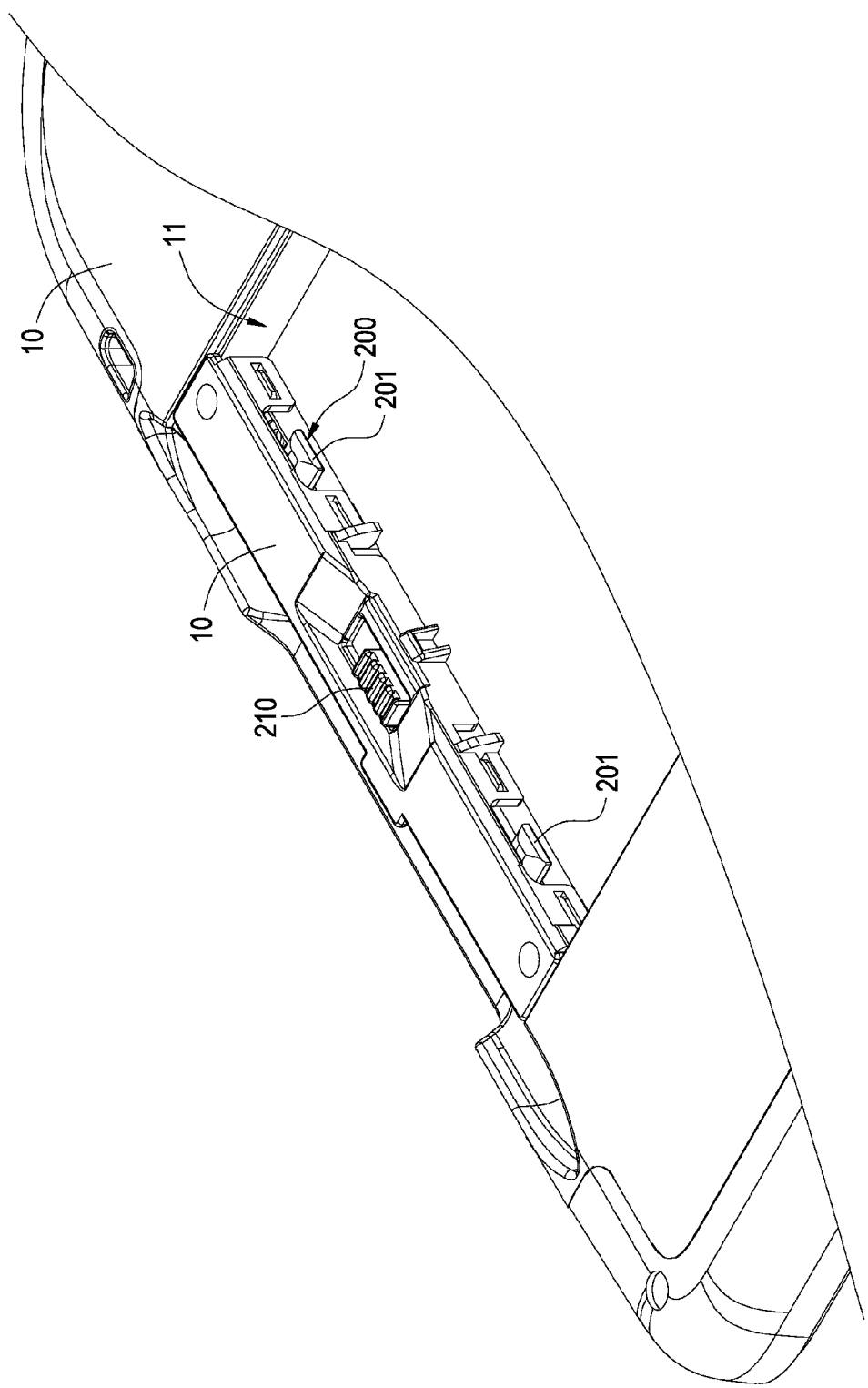
FIG. 5 is a schematic view of the sliding tongue of the structure with detachable battery for an electronic device according to the first embodiment of the present invention.
Figure 6:
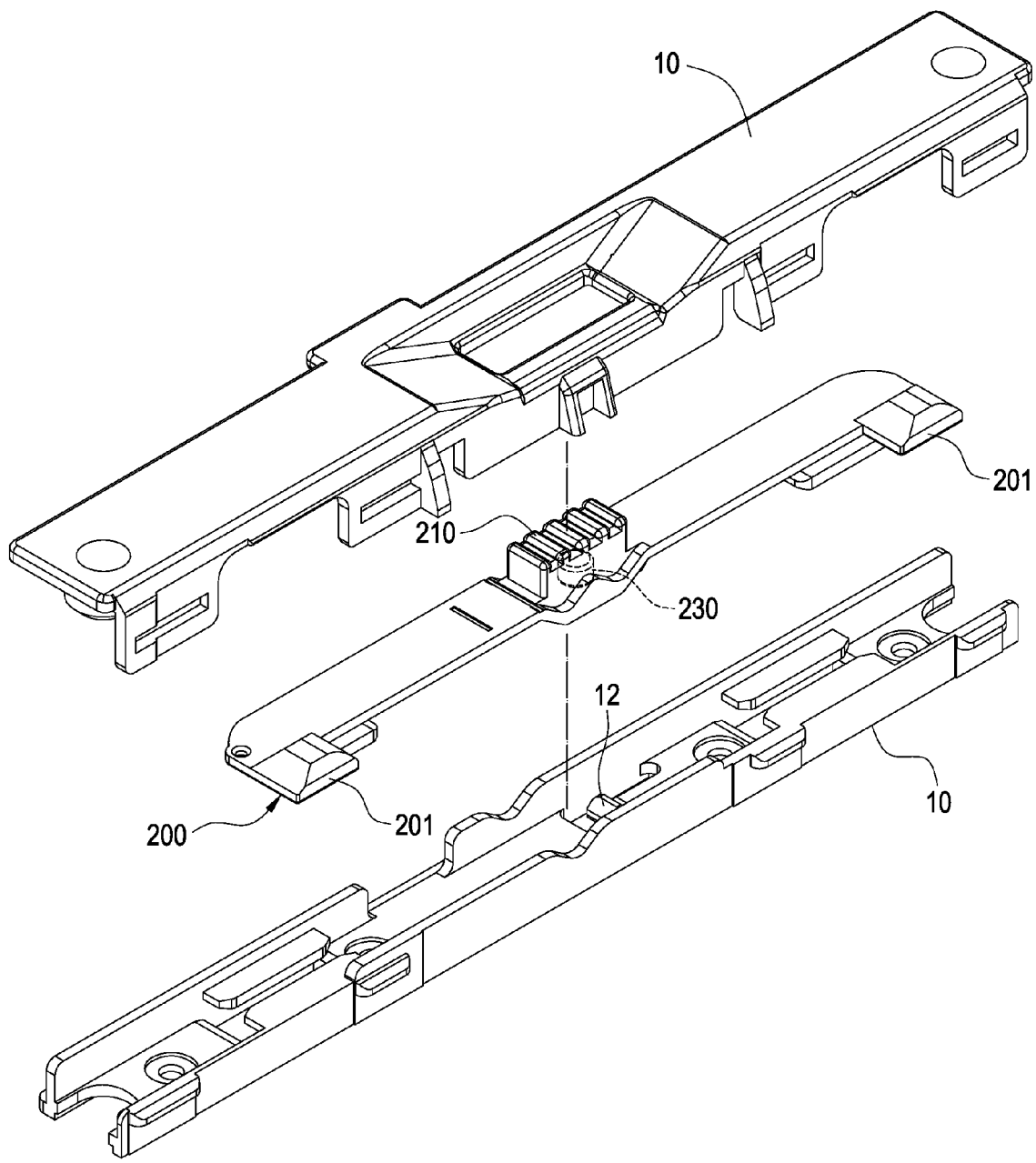
FIG. 6 is a perspective schematic view of the sliding tongue of the structure with detachable battery for an electronic device according to the first embodiment of the present invention.
Figure 7:
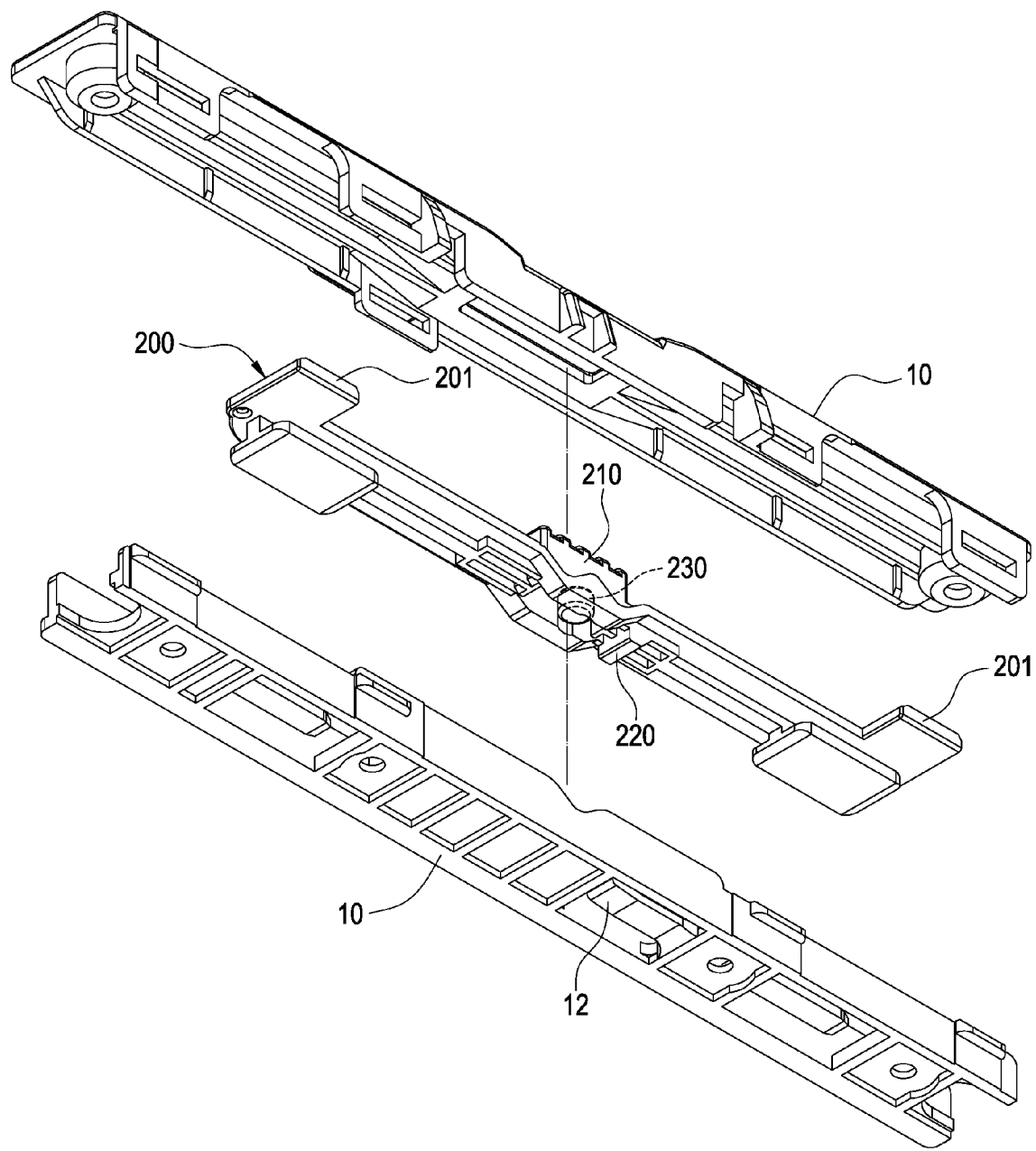
FIG. 7 is another perspective schematic view of the sliding tongue of the structure with detachable battery for an electronic device according to the first embodiment of the present invention.
Figure 8:
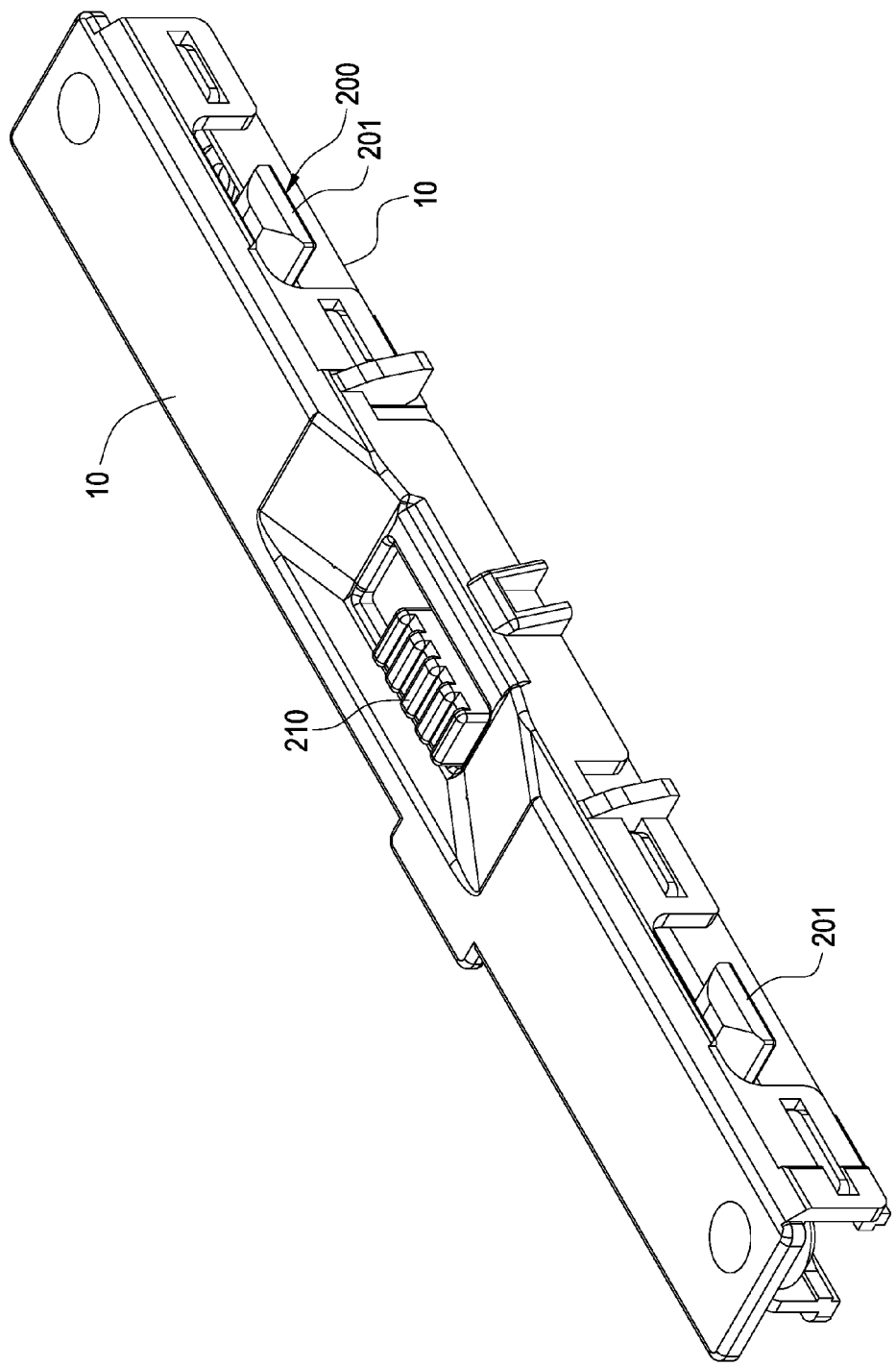
FIG. 8 is a schematic view of another configuration of the sliding tongue of the structure with detachable battery for an electronic device according to the first embodiment of the present invention.
Figure 9:
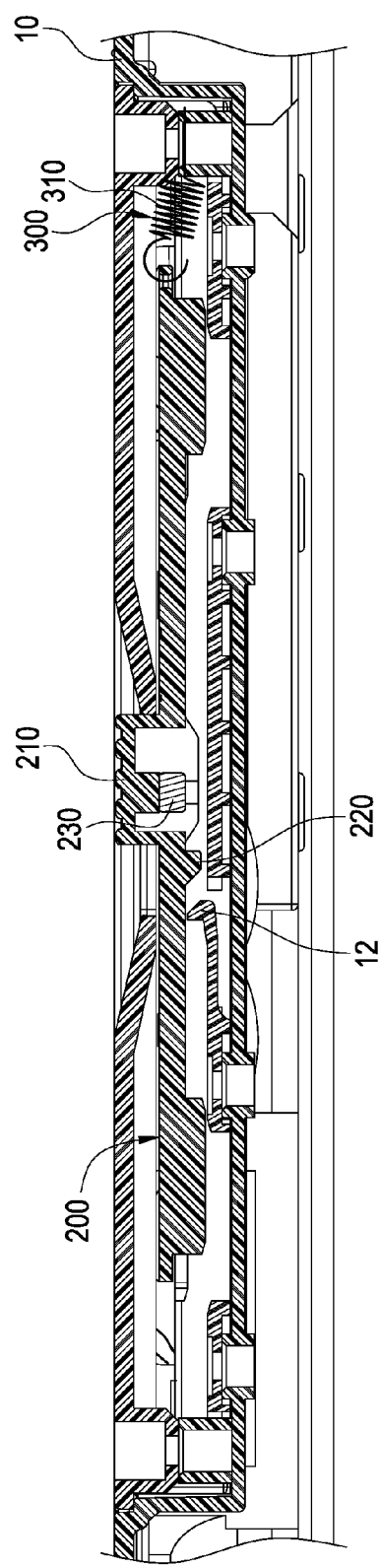
FIG. 9 is a schematic view of the structure with detachable battery for an electronic device according to the first embodiment of the present invention, showing the sliding tongue located at the first position.
Figure 10:
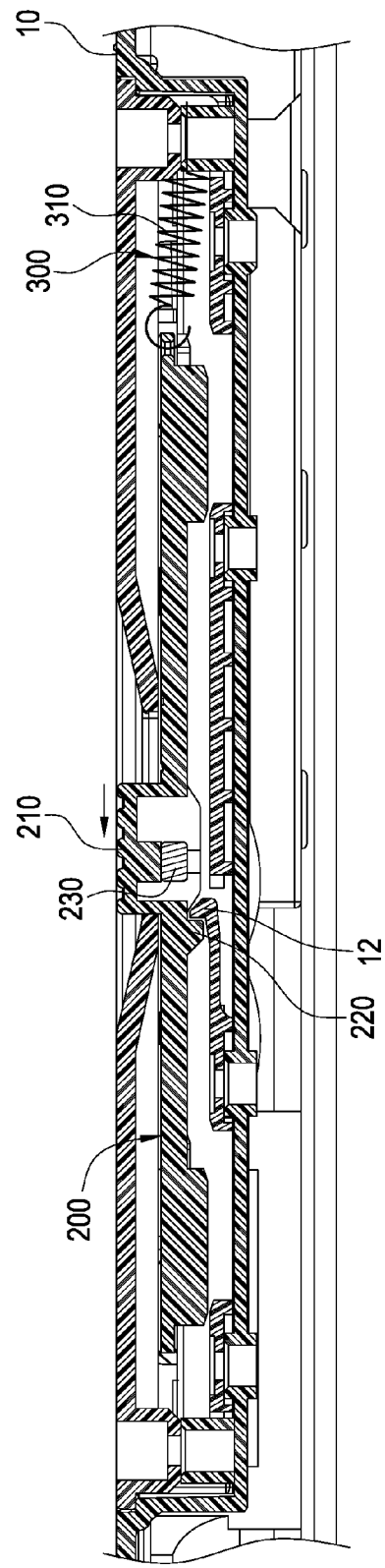
FIG. 10 is a schematic view of the structure with detachable battery for an electronic device according to the first embodiment of the present invention, showing the sliding tongue located at the second position.

Referring to FIG. 4, FIG. 9, and FIG. 10, in this embodiment, a restoring member 300 is connected between the sliding tongue 200 and the electronic device casing 10. The restoring member 300 pulls the sliding tongue 200 toward the first position to achieve restoration. In this embodiment, the restoring member 300 is a spring 310, but the present invention is not limited thereto.

Figure 11:
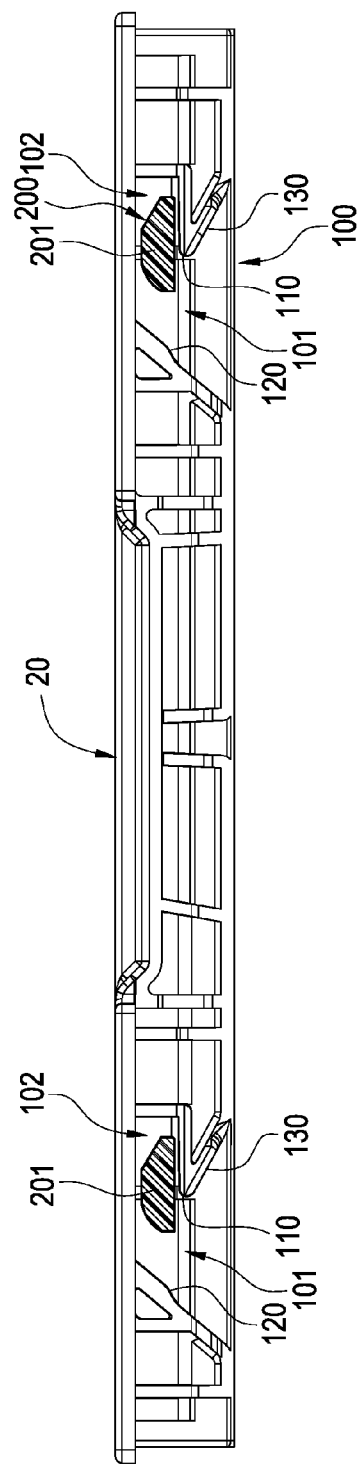
FIG. 11 is a schematic view of the structure with detachable battery for an electronic device according to the first embodiment of the present invention, showing that a battery is fixed in place when the sliding tongue is located at the first position.
Figure 12:
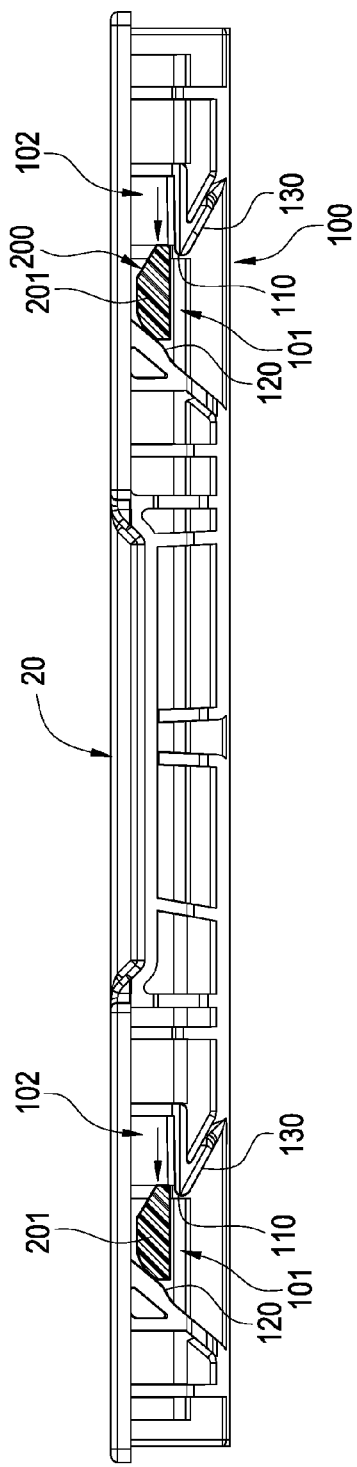
FIG. 12 is a schematic view of the structure with detachable battery for an electronic device according to the first embodiment of the present invention, showing that the battery is released when the sliding tongue is located at the second position.

Referring to FIG. 9 and FIG. 11, with the sliding tongue 200 being located at the first position and the battery 20 being pushed into and positioned in the chamber 11, the sliding tongue 200 is pulled toward the first position by the restoring member 300 so that the at least one tongue portion 201 is fitted into the engaging groove 102, thereby fixing the battery 20 inside the chamber 11. The guiding angle 110 of the rim of the engaging groove 102 guides the at least one tongue portion 201 into the engaging groove 102.

Referring to FIG. 9, FIG. 10, FIG. 11, and FIG. 12, the at least one tongue portion 201 abuts against the releasing-guiding slope 120 respectively while the sliding tongue 200 is being moved from the first position to the second position, thereby ejecting the battery 20 out of the chamber 11. In this embodiment, the sliding tongue 200 has a first positioning structure 220, whereas the electronic device has a second positioning structure 12 corresponding in position to the first positioning structure 220. In this embodiment, the first positioning structure 220 and the second positioning structure 12 are two hooks engaged with each other, but the present invention is not limited thereto. With the at least one tongue portion 201 being removed from the engaging grooves 102, respectively, the first positioning structure 220 becomes engaged with the second positioning structure 12 and thus offsets the thrust of the restoring member 300 such that the sliding tongue 200 is fixed to the second position, thereby facilitating the replacement of the battery 20. With the sliding tongue 200 being fixed to the second position and the battery 20 being pushed into the chamber 11, the releasing-guiding slope 120 abuts against the sliding tongue 200 such that the sliding tongue 200 moves toward the first position; hence, the first positioning structure 220 separates from the second positioning structure 12 and guides the at least one tongue portion 201 into the engaging groove 102.

Figure 13:
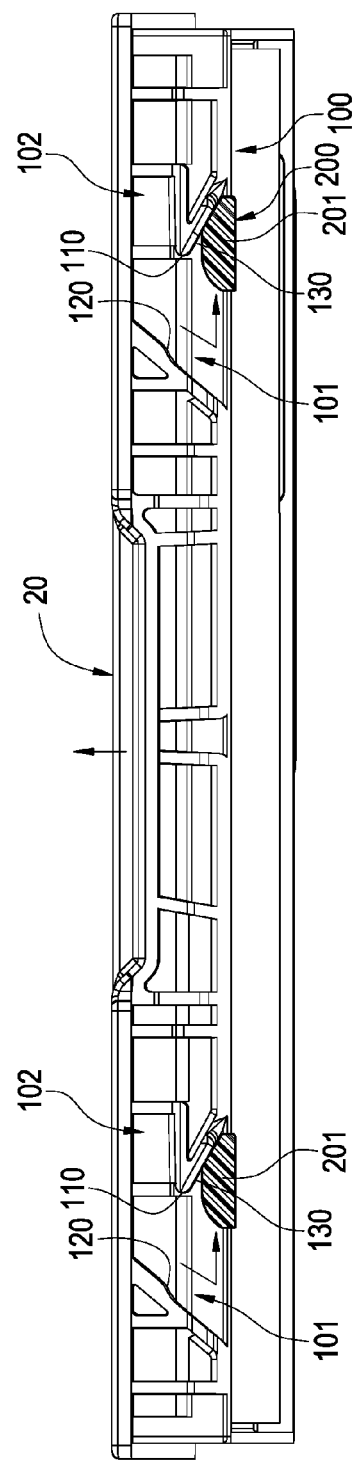
FIG. 13 is a schematic view of the structure with detachable battery for an electronic device according to the first embodiment of the present invention, showing that the battery is mounted in place when the sliding tongue is located at the first position.

Referring to FIG. 13, in this embodiment, the rim of the engaging groove 102 preferably has a locking-guiding slope 130. With the sliding tongue 200 being located at the first position and the battery 20 being pushed into the chamber 11, the locking-guiding slope 130 abuts against the at least one tongue portion 201 and guides the at least one tongue portion 201 such that the sliding tongue 200 moves toward the second position and then is driven by the restoring member 300 to move, thereby causing the at least one tongue portion 201 to move into the engaging grooves 102, respectively. Therefore, even if the battery 20 is taken out but the sliding tongue 200 is not fixed to the second position, pushing the battery 20 into the chamber 11 can push the sliding tongue 200 because of the guiding slopes, thereby facilitating the mounting process.

Referring to FIG. 6 through FIG. 10, in this embodiment, a magnetic component 230 is embedded in the stud 210 of the sliding tongue 200. In this embodiment, a magnetic component 230 is preferably a permanent magnet. A reed switch corresponding in position to the magnetic component 230 is disposed in the electronic device casing 10. The reed switch senses the magnetic component 230 and determines the positions of the magnetic component 230 and the reed switch relative to each other, so as to determine whether the battery 20 is fixed inside the chamber 11 by the sliding tongue 200. When the sliding tongue 200 reaches the second position, the reed switch senses a variation (such as an increase or a decrease) in a magnetic force because of a change in the positions of the magnetic component 230 and the reed switch relative to each other, and in consequence the electronic device starts a backup power, thereby allowing the user to change the battery 20 without turning off the electronic device.

Like what is shown in FIG. 1 and FIG. 2 of the first embodiment of the present invention, the second embodiment of the present invention provides a battery mounting and dismounting structure for an electronic device, comprising an electronic device casing 10, a guiding structure 100, and a sliding tongue 200. The second embodiment is similar to the first embodiment in terms of the structural features of the battery mounting and dismounting structure for an electronic device. Their similarity is not described below for the sake of brevity, but their differences are described below.

Figure 14:
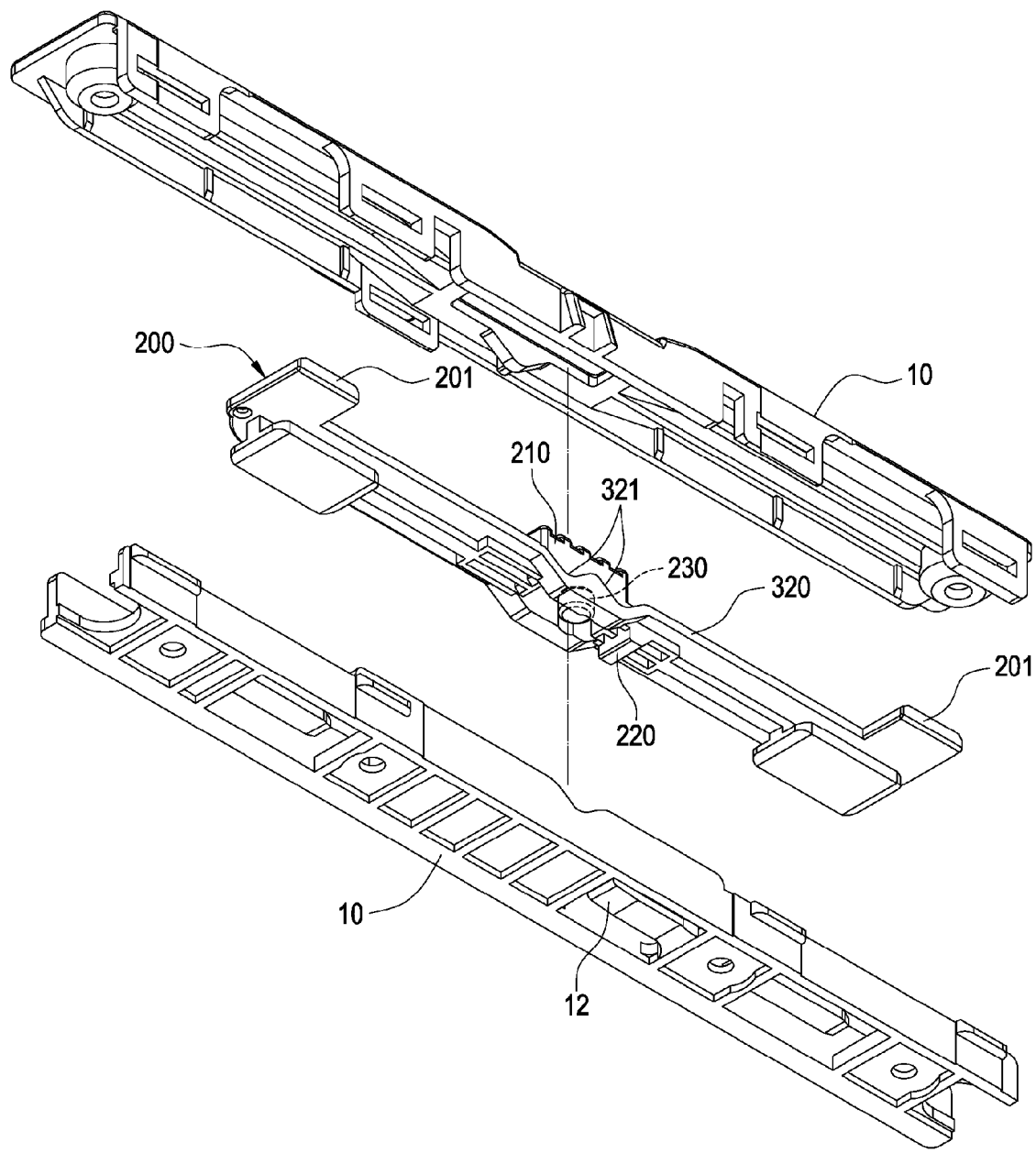
FIG. 14 is a schematic view of the configuration of the sliding tongue of the structure with detachable battery for an electronic device according to the second embodiment of the present invention.
Figure 15:
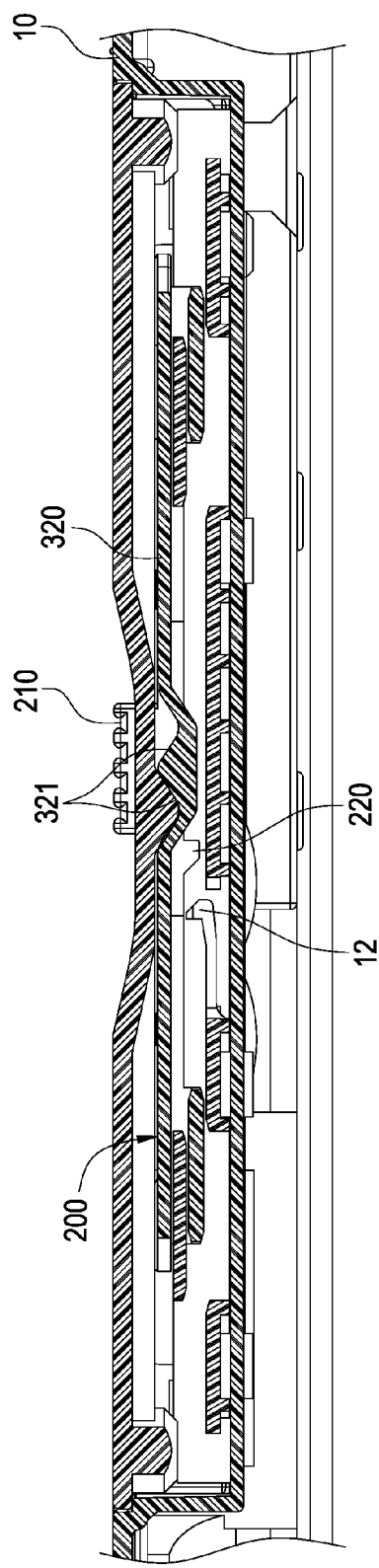
FIG. 15 is a schematic view of the structure with detachable battery for an electronic device according to the second embodiment of the present invention, showing the sliding tongue located at the first position.
Figure 16:
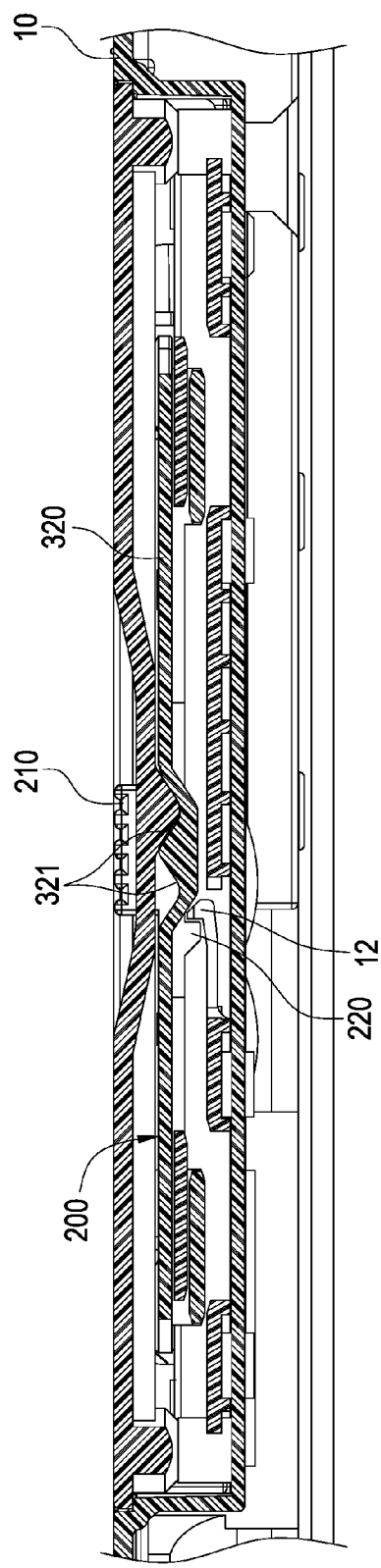
FIG. 16 is a schematic view of the structure with detachable battery for an electronic device according to the second embodiment of the present invention, showing the sliding tongue located at the second position.

Referring to FIG. 14 through FIG. 16, in the second embodiment of the present invention, the restoring member 300 is a resilient arm 320 connected to the electronic device casing 10. The resilient arm 320 has a diversion slope 321 which the sliding tongue 200 abuts against. The sliding tongue 200 abuts against the diversion slope 321 of the resilient arm 320. The resilient arm 320 exerts an elastic force between the electronic device casing 10 and the sliding tongue 200 to drive the sliding tongue 200 to move relative to the electronic device casing 10. Confined to a short wide receiving space, the resilient arm 320 requires the diversion slope 321 to produce a component of a force in the movement direction of the sliding tongue 200 so that the sliding tongue 200 can move between the first position (shown in FIG. 15) and the second position (shown in FIG. 16).

The present invention is disclosed above by preferred embodiments. However, the preferred embodiments are not restrictive of the claims of the present invention. Equivalent changes made to the preferred embodiments according to the patent-related spirit of the present invention should fall within the scope of the claims of the present invention.

What is claimed is:

1. A structure with detachable battery for an electronic device, comprising:
    an electronic device casing having a chamber for receiving a battery;
    a guiding structure disposed on an outer sidewall of the battery and comprising a guiding groove and an engaging groove laterally disposed in the guiding groove, wherein the guiding groove and the chamber are open toward each other, with the engaging groove being open in a transverse direction of the chamber, and a releasing-guiding slope opposite the engaging groove is disposed in the guiding groove to extend from the opening of the guiding groove and tilt toward the engaging groove; and
    a sliding tongue disposed slidably on an inner sidewall of the chamber to not only slide within the guiding groove but also selectively slide and become fitted into the engaging groove such that the battery is fixed inside the chamber or slidably abuts against the releasing-guiding slope, thereby ejecting the battery out of the chamber;
    wherein the sliding tongue has a magnetic component, and the electronic device has a reed switch corresponding in position to the magnetic component, allowing the electronic device to start a backup power as soon as the reed switch senses the magnetic component and thereby determines that the sliding tongue has exited the engaging groove.

2. The structure with detachable battery of claim 1, wherein a restoring member is connected between the sliding tongue and the electronic device casing and adapted to move the sliding tongue toward the engaging groove.

3. The structure with detachable battery of claim 2, wherein the sliding tongue has a first positioning structure, and the electronic device has a second positioning structure corresponding in position to the first positioning structure, allowing the first positioning structure to engage with the second positioning structure such that the sliding tongue becomes fixed in place as soon as the sliding tongue exits the engaging groove.

4. The structure with detachable battery of claim 2, wherein the restoring member is a spring.

5. The structure with detachable battery of claim 2, wherein the restoring member is a resilient arm which connects with the electronic device casing and abuts against the sliding tongue.

6. The structure with detachable battery of claim 5, wherein the resilient arm has a diversion slope which the sliding tongue abuts against.

7. The structure with detachable battery of claim 2, wherein the sliding tongue slides between a first position and a second position, and a rim of the engaging groove is defined with a locking-guiding slope, and, with the sliding tongue being located at the first position and the battery being pushed into the chamber, the locking-guiding slope abuts against the sliding tongue and guides the sliding tongue toward the second position before the restoring member moves the sliding tongue into the engaging groove.

8. The structure with detachable battery of claim 1, wherein the sliding tongue slides between a first position and a second position, and a rim of the engaging groove is defined with a locking-guiding slope, and, with the sliding tongue being located at the first position and the battery being pushed into the chamber, the locking-guiding slope abuts against the sliding tongue and guides the sliding tongue toward the second position before the releasing-guiding slope abuts against the sliding tongue and guides the sliding tongue into the engaging groove.

9. The structure with detachable battery of claim 8, wherein the rim of the engaging groove is defined with a guiding angle for guiding the sliding tongue into the engaging groove.

10. The structure with detachable battery of claim 1, wherein the sliding tongue slides between a first position and a second position, and, with the sliding tongue being located at the first position and the battery being positioned in the chamber, the sliding tongue is fitted into the engaging groove.

11. The structure with detachable battery of claim 1, wherein the sliding tongue slides between a first position and a second position, and the sliding tongue abuts against the releasing-guiding slope when the sliding tongue is located at the second position, thereby ejecting the battery out of the chamber.

12. The structure with detachable battery of claim 1, wherein the sliding tongue slides between a first position and a second position, and, with the sliding tongue being located at the second position and the battery being pushed into the chamber, the releasing-guiding slope abuts against the sliding tongue and guides the sliding tongue into the engaging groove.

13. The structure with detachable battery of claim 12, wherein a rim of the engaging groove is defined with a guiding angle for guiding the sliding tongue into the engaging groove.

\* \* \* \* \*